United States Patent
Schulz

(10) Patent No.: US 8,979,183 B2
(45) Date of Patent: Mar. 17, 2015

(54) REMOVABLE ROOF FOR A MOTOR VEHICLE, AND MOTOR VEHICLE

(71) Applicant: Ing. h. c. F. Porsche Aktiengesellschaft, Stuttgart (DE)

(72) Inventor: Lars Schulz, Schoeneiche (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 13/944,186

(22) Filed: Jul. 17, 2013

(65) Prior Publication Data

US 2014/0035328 A1  Feb. 6, 2014

(30) Foreign Application Priority Data

Jul. 31, 2012 (DE) .......................... 10 2012 106 968

(51) Int. Cl.
  *B60J 7/11* (2006.01)
  *B60J 10/12* (2006.01)
  *B60J 7/10* (2006.01)

(52) U.S. Cl.
  CPC ..................................... *B60J 7/106* (2013.01)
  USPC ....................................................... 296/218

(58) Field of Classification Search
  CPC ........................................................ B60J 7/11
  USPC ................. 296/218, 146.14, 146.16; 280/756
  See application file for complete search history.

(56) References Cited

U.S. PATENT DOCUMENTS

| | | | | |
|---|---|---|---|---|
| 4,729,596 | A | * | 3/1988 | Fujihara et al. ............... 296/218 |
| 4,729,597 | A | * | 3/1988 | Fujihara et al. ............... 296/218 |
| 4,801,173 | A | * | 1/1989 | Trenkler ....................... 296/218 |
| 4,881,773 | A | * | 11/1989 | Ichinose .................. 296/216.09 |
| 6,926,330 | B2 | | 8/2005 | Scholz et al. |
| 7,017,982 | B2 | | 3/2006 | Homann et al. |

FOREIGN PATENT DOCUMENTS

| | | |
|---|---|---|
| DE | 9406435 | 7/1994 |
| DE | 19716390 | 8/1998 |
| DE | 102 54 132 | 6/2004 |
| DE | 102010014493 | 10/2011 |
| JP | 3-91219 | 9/1991 |
| JP | 04-368226 | 12/1992 |

\* cited by examiner

*Primary Examiner* — Dennis H Pedder
(74) *Attorney, Agent, or Firm* — Gerald E. Hespos; Michael J. Porco; Matthew T. Hespos

(57) ABSTRACT

A removable roof can be positioned between a windshield frame and a rollover hoop of a motor vehicle. The roof is divided in the longitudinal direction of the motor vehicle to form first and second roof elements. Seal profiles (22, 28, 29) are integrated into edges (13, 15, 16) of the roof elements (12) running in the longitudinal direction of the motor vehicle to provide sealing of the roof elements (11, 12) with respect to side windows and with respect to one another. The same seal profiles (23, 30) are integrated into the first and second roof elements at edges (27, 29) running transverse to the longitudinal direction of the motor vehicle to provide sealing with respect to the rollover hoop (40) and a rear window (39) assigned to the rollover hoop (40).

12 Claims, 7 Drawing Sheets

US 8,979,183 B2

REMOVABLE ROOF FOR A MOTOR VEHICLE, AND MOTOR VEHICLE

CROSS REFERENCE TO RELATED APPLICATION

This application claims priority under 35 USC 119 to German Patent Appl. No. 10 2012 106 968.9 filed on Jul. 31, 2012, the entire disclosure of which is incorporated herein by reference.

BACKGROUND

1. Field of the Invention

The invention relates to a removable roof for a motor vehicle and to a motor vehicle having a removable roof.

2. Description of the Related Art

DE 102 54 132 A1 discloses a removable roof that can be positioned between a windshield frame and a rollover hoop of a motor vehicle, and particularly a sports car. This known roof is divided in the longitudinal direction of the motor vehicle to form two roof elements. Seal profiles are integrated on longitudinal edges of the roof elements to seal the roof elements with respect to side windows and with respect to one another. Thus, the roof is sealed to a certain extent, but there is a requirement for improved sealing.

Accordingly, it is an object of the invention to provide a novel removable roof for a motor vehicle, and a motor vehicle with such a roof.

SUMMARY OF THE INVENTION

The invention relates to a removable roof for a motor vehicle. The removable roof has first and second roof elements, and the substantially identical seal profiles are integrated into edges of the roof elements that run transversely with respect to the longitudinal direction of the motor vehicle. The seal profiles provide sealing of the roof elements with respect to the rollover hoop and with respect to a rear window assigned to the rollover hoop.

The seal profiles integrated into the first roof element preferably define a U-shaped sealing element together with shaped parts integrated into corner regions of the first roof element to permit a particularly advantageous integration of the three seal profiles into the first roof element.

The seal profiles integrated into the second roof element preferably define an L-shaped sealing element together with shaped parts integrated into corner regions of the first roof element to permit a particularly advantageous integration of the two seal profiles into the second roof element.

Sheet-metal inlays preferably are integrated into the shaped parts for fastening the shaped parts to the respective roof element. Thus, the shaped parts can be fastened in a particularly advantageous and reliable manner to a wall of the roof element.

DETAILED DESCRIPTION OF THE PREFERRED EMBODIMENTS

Figure 1:
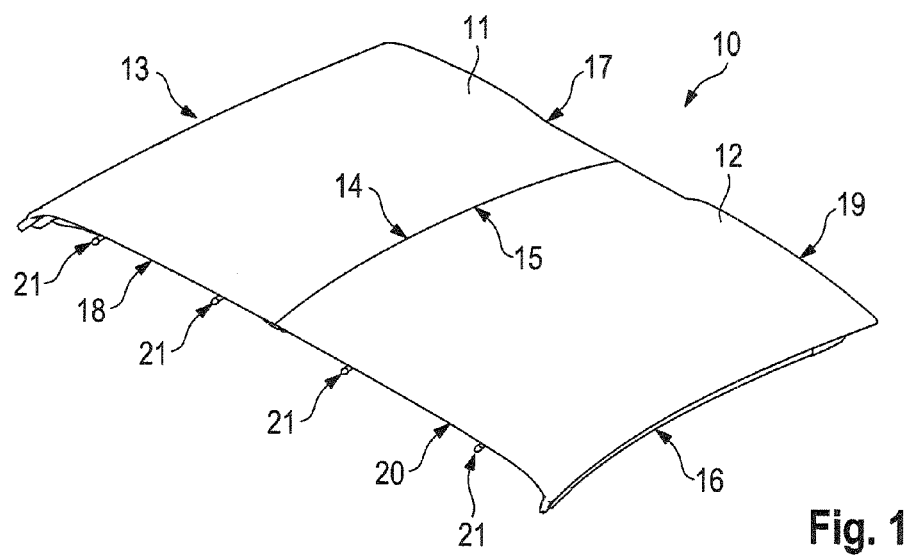
FIG. 1 is a top perspective view of a removable roof for a motor vehicle.

FIG. 1 is a perspective view of a roof 10 according to the invention. The roof 10 is formed from two roof elements 11 and 12 that are arranged so that the roof 10 is divided in the longitudinal direction of the motor vehicle.

The roof element 11 has outer and inner side edges 13, 14 that run in the longitudinal direction of the motor vehicle and 12, and the roof element 12 has inner and outer side edges 15, 16 that run in the longitudinal direction of the motor vehicle. The outer side edges 13, 16 of the roof elements 11, 12 run adjacent to side windows of the motor vehicle, and the inner side edges 14, 15 of the roof elements 11, 12 are directly opposite one another in the assembled state of the roof 10.

The roof elements 11 and 12 also have rear edges 17 and 19 that run transverse to the longitudinal direction of the motor vehicle. The rear edges 17 and 19 of the respective roof elements 11 and 12 are adjacent to at least one rollover hoop of the motor vehicle and a rear window assigned to the at least one rollover hoop. The roof elements 11 and 12 further have front edges 18 and 20 that run transverse to the longitudinal direction of the motor vehicle. The front edges 18 and 20 of the respective roof elements 11 and 12 are adjacent to a windshield frame of the motor vehicle when the roof is mounted between the windshield frame and the rollover hoop of the motor vehicle. Pin-like mounting aids 21 are formed on the front edges 18, 20 of the roof elements 11, 12 and can be inserted into recesses (not shown) of the windshield frame (not shown) to align the roof elements 11 and 12 of the roof 10 precisely during the mounting of the roof 10 between the windshield frame and the rollover hoop.

Figure 2:
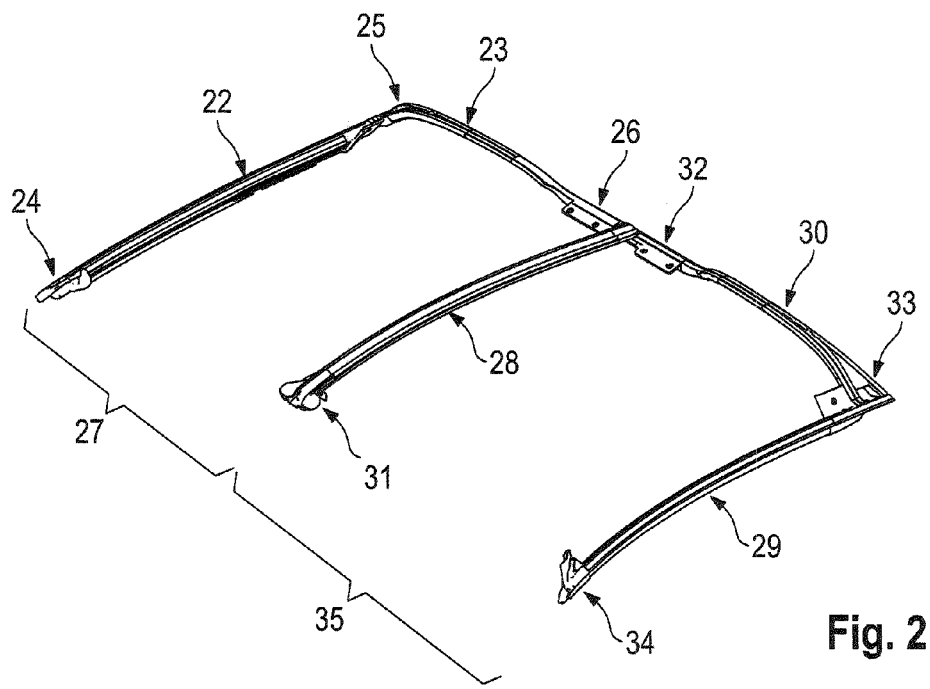
FIG. 2 shows sealing elements of the roof of FIG. 1.
Figure 3:
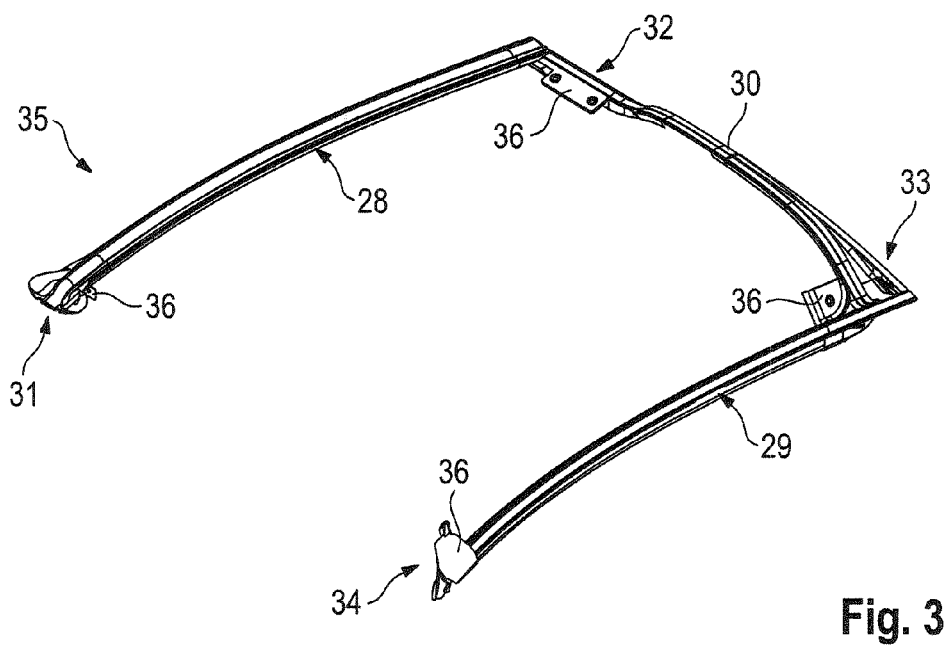
FIG. 3 shows a first of the sealing elements of the roof of FIG. 1.
Figure 4:
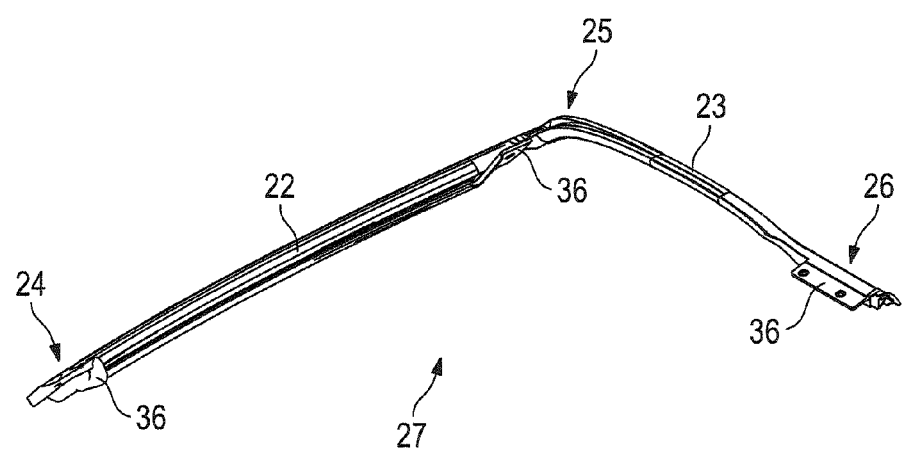
FIG. 4 shows a second of the sealing elements of the roof of FIG. 1.

FIGS. 2 to 4 show details of elastomeric or resilient seal profiles and shaped parts that are integrated into the roof elements 11, 12 of the roof 10.

FIG. 4 shows a seal profile 22 that extends in the longitudinal direction of the roof element 11 in the region of the outer side edge 13 and a seal profile 23 that extends transverse to the longitudinal direction of the motor vehicle along the rear edge 17. Shaped parts 24, 25 and 26 are integrated with the two seal profiles 22 and 23 at corner regions of the first roof element 11 to define an L-shaped sealing element 27. The shaped part 24 is at the front outer corner of the roof element 11, the shaped part 25 is assigned to the rear outer corner and the shaped part 26 is assigned to the rear inner corner of the roof element 11.

FIG. 3 shows a seal profile 28 that extends in the longitudinal direction of the motor vehicle in the region of the inner side edge 15 and a seal profile 29 that extends in the longitudinal direction of the motor vehicle in the region of the outer side edge 16 of the roof element 12. Furthermore, a seal profile 30 is integrated into the roof element 12 and extends transversely with respect to the longitudinal direction of the motor vehicle in the region of the rear edge 19 of the roof element 12. The seal profile 30 of the roof element 12 and the seal profile 23 of the roof element 11 seal the roof 10 with respect to the rollover hoop and with respect to the rear window that is assigned to the rollover hoop of the motor vehicle.

Elastomeric shaped parts 31, 32, 33 and 34 also are integrated into the roof element 12. Specifically, the shaped part 31 is assigned to a front inner corner of the roof element 12, the shaped part 32 is assigned to a rear inner corner of the roof element 12, the shaped part 33 is assigned to a rear outer corner of the roof element 12, and the shaped part 34 is assigned to a front outer corner of the roof element 12. The seal profiles 28, 29 and 30 that are integrated into the roof element 12 and the shaped parts 31, 32, 33 and 34 that are assigned to the corner regions form a U-shaped sealing element 35.

Sheet-metal inlays 36 are integrated, for example, by insert molding, into all of the shaped parts 24, 25, 26, 31, 32, 33 and 34, as shown in FIGS. 3 and 4. Each of the sheet-metal inlays 36 functions to fasten the respective shaped part to the respective roof element 11, 12. As shown in the cross sections in FIGS. 5 and 6, each roof element 11, 12 has an inner wall 37 and an outer wall 38, and the sheet-metal inlays 36 that are integrated into the shaped parts 24, 25, 26, 31, 32, 33, 34 function to fasten the respective shaped part to the outer wall 38 of the respective roof element 11, 12. As shown in FIGS. 3 and 4, at least one recess or hole is formed into each sheet-metal inlay 36 for screwing or riveting the respective sheet-metal inlay 36 to the outer wall 38 of the respective roof element 11, 12.

Figure 5:
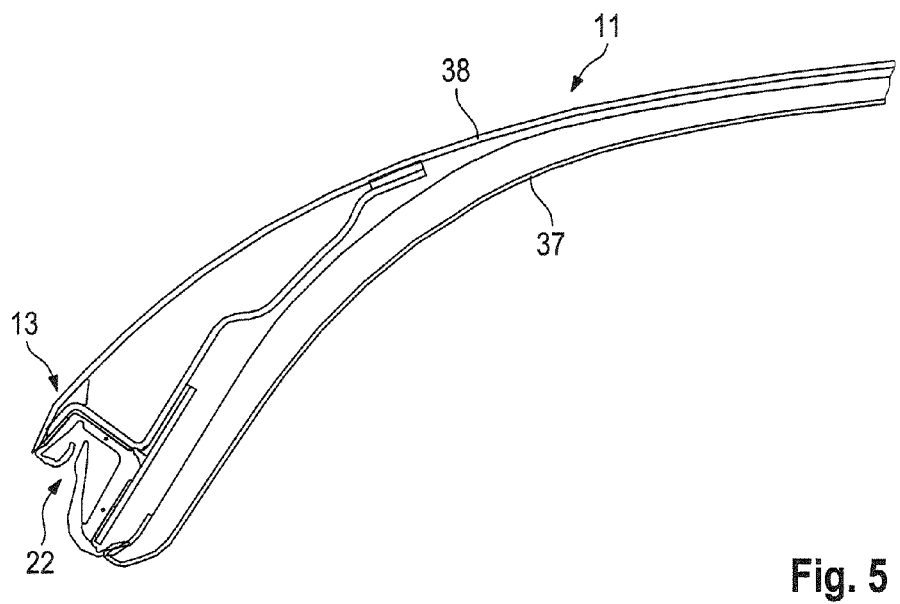
FIG. 5 is a partial cross section through a roof element of the roof of FIG. 1 in the region of an outer edge running in the longitudinal direction of the motor vehicle.

FIG. 5 is a partial cross section through the roof element 11 in the region of the outer side edge 13 that runs in the longitudinal direction, and shows the seal profile 22 that is integrated into the roof element 11 in the region of the outer side edge 13 for sealing the roof element 11 with respect to a side window of the motor vehicle.

Figure 6:
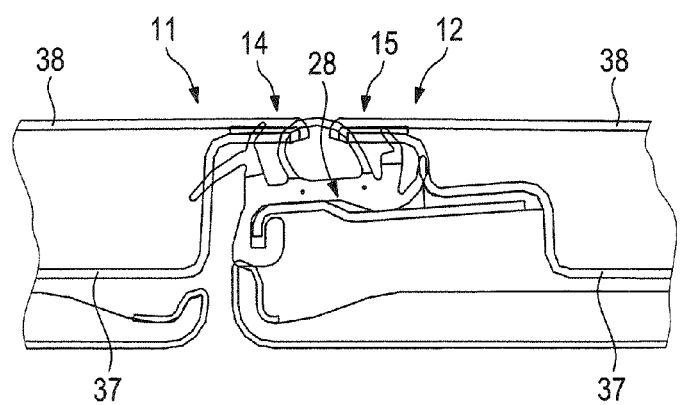
FIG. 6 is a partial cross section through both roof elements of the roof of FIG. 1 in the region of inner edges running in the longitudinal direction of the motor vehicle.

FIG. 6 is a partial cross section through the two roof elements 11 and 12 in the mounted state thereof in the region of the inner side edges 14 and 15. Thus, FIG. 6 shows the seal profile 28 that is integrated into the roof element 12 in the region of the inner side edge 15 for sealing with respect to the inner side edge 14 of the roof element 12.

Figure 7:
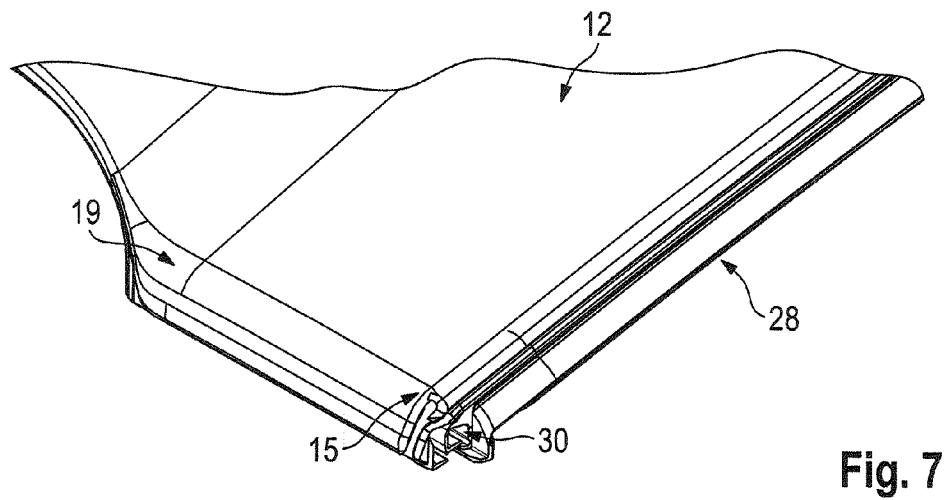
FIG. 7 is a perspective view of a roof element of the roof of FIG. 1 in the region of a rear inner corner of the roof element.
Figure 8:
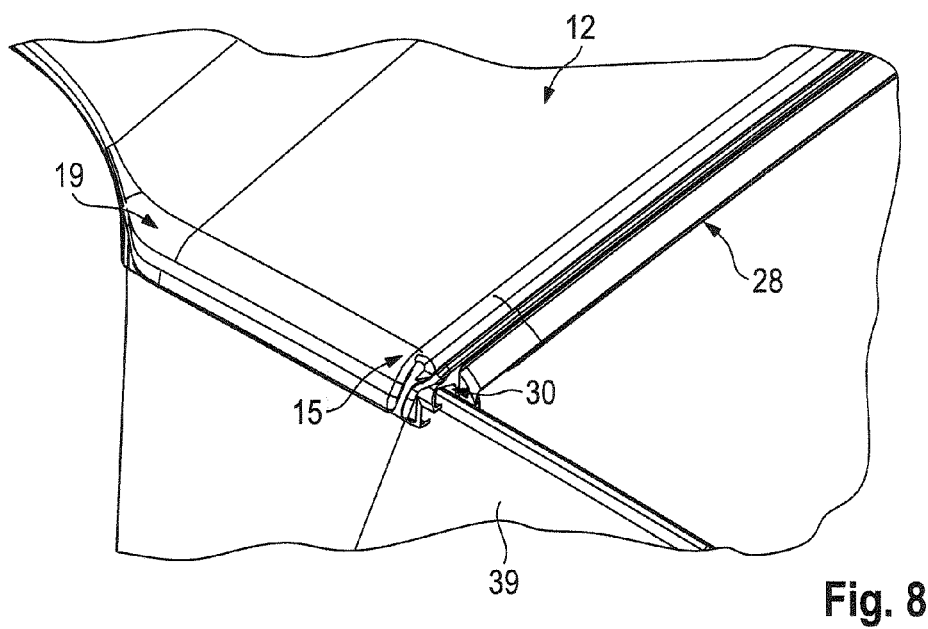
FIG. 8 shows the view of FIG. 7 together with a rear window.

FIGS. 7 and 8 show different views of a detail of a rear inner corner region of the roof element 12 of the roof 10, including the seal profile 28 of the roof element 12 that functions to seal the two roof elements 11 and 12 with respect to one another. The seal profile 30 is integrated in the region of the edge 19 of the roof element 12 for sealing the roof element 12 with respect to a rollover hoop (not shown) and with respect to a rear window 39 assigned to the rollover hoop. The rear window 39 is shown in FIG. 8.

Figure 9:
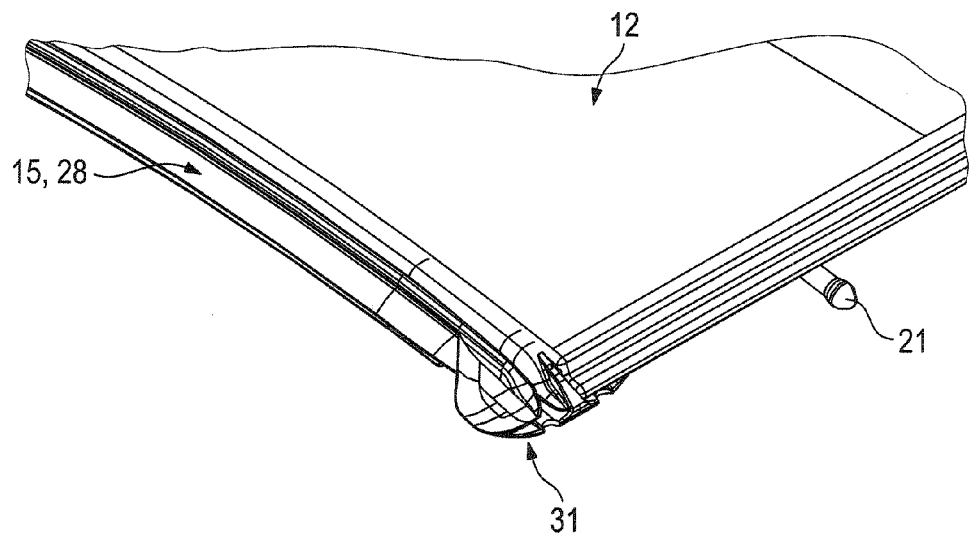
FIG. 9 is a perspective view of a roof element of the roof of FIG. 1 in the region of a front outer corner of the roof element.
Figure 10:
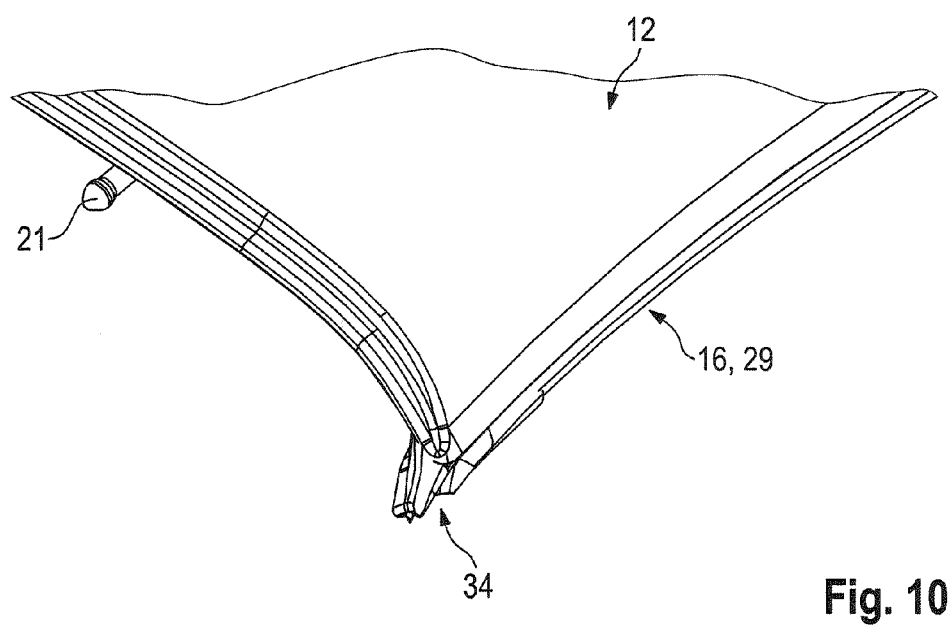
FIG. 10 is a perspective view of a roof element of the roof of FIG. 1 in the region of a front inner corner of the roof element.

FIG. 9 shows a detail in the region of the front inner corner of the roof element 12, and FIG. 10 shows a detail in the region of the front outer corner of the roof element 12. More particularly, FIGS. 9 and 10 show the seal profiles 28 and 29 that are assigned to the edges of the roof element 12, and shaped parts 31 and 34.

Figure 11:
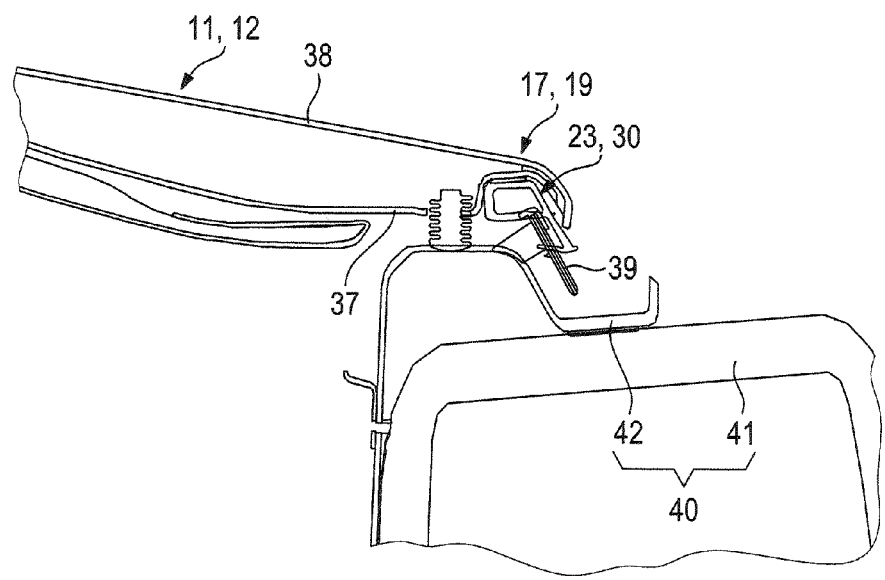
FIG. 11 is a first cross section through the roof in the longitudinal direction of the motor vehicle together with a rollover hoop and a rear window.
Figure 12:
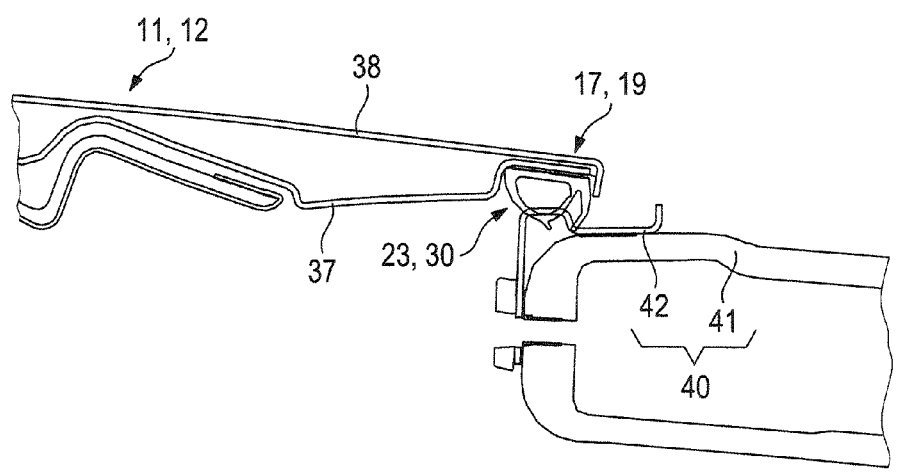
FIG. 12 is a second cross section through the roof in the longitudinal direction of the motor vehicle together with the rollover hoop.

FIGS. 11 and 12 are cross sections offset transversely with respect to the longitudinal direction of the motor vehicle and run in the longitudinal direction of the motor vehicle through one of the roof elements 11 or 12 in the region of the transverse rear edge 17 or 19 of the respective roof element 11, 12. Thus, FIGS. 11 and 12 show the seal profiles 23 or 30 that are integrated into the respective roof element 11 or 12 in the region of the rear edge 17 or 19 respectively. The cross sections of FIGS. 11 and 12 show the removable roof 10 when mounted between a windshield frame (not shown) and a rollover hoop 40. The rollover hoop 40 has a structural component 41 that is mounted fixedly on a motor vehicle bodyshell and a panel 42 that is mounted on the structural component 41 of the rollover hoop 40. FIG. 11 is a cross section through the arrangement composed of the roof 10 and the rollover hoop 40 in a region of the rear window 39 that is a constituent part of the rollover hoop 40. The rear window 39 does not run at the position of the cross section of FIG. 12.

FIGS. 11 and 12 show that the seal profiles 23 and 30 that extend in the region of the rear edge 17 or 19 of the roof elements 11 and 12 provide sealing with respect to the rear window 39 in portions where the rear window 39 runs. FIG. 12 also shows that the sealing profiles 23 and 30 provide sealing with respect to the panel 42 of the rollover hoop 40 in portions in which the rear window 39 does not extend. The resiliently deflectable elements of the sealing profiles 23 and 30 are configured to seal against either the rear window 39 or the rollover hoop 40, depending upon the position along the sealing profiles 23 and 30.

Figure 13:
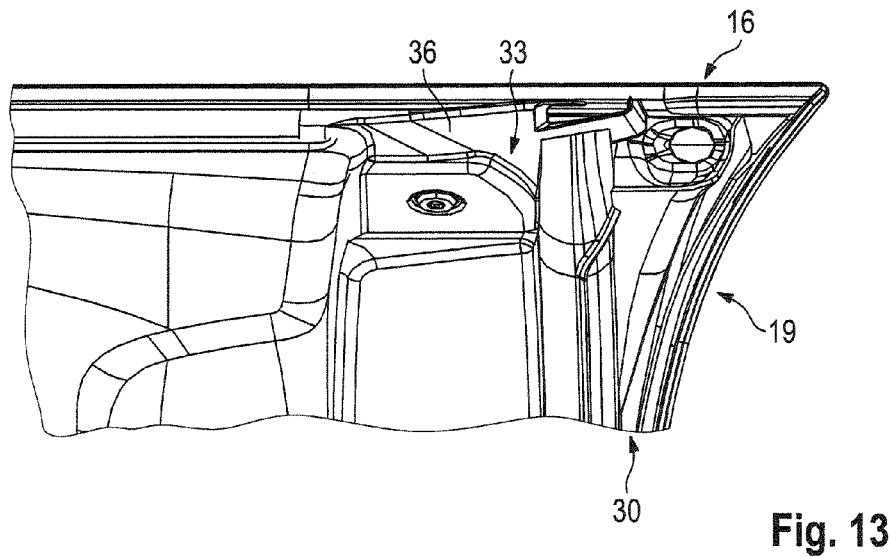
FIG. 13 is a bottom view of a front corner of a roof element.
Figure 14:
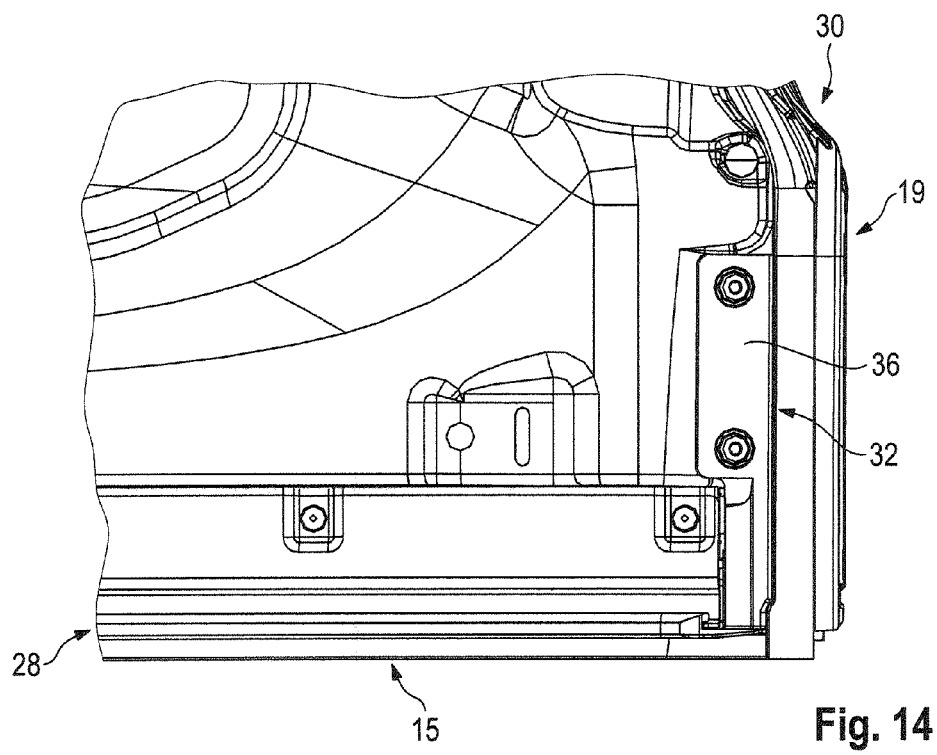
FIG. 14 is a bottom view of a rear corner of a roof element.

FIG. 13 shows the region of the rear outer corner of the roof element 12 from below and FIG. 14 shows the region of the rear inner corner of the roof element 12 from below. In particular, FIGS. 13 and 14 show the region of the shaped parts 32 and 33 to illustrate how the sheet-metal inlays 36 of the shaped parts 32 and 33 are screwed to the respective roof element 12.

What is claimed is:

1. A removable roof for a motor vehicle that can be positioned between a windshield frame and a rollover hoop of a motor vehicle, the removable roof comprising: first and second roof elements divided from one another in a longitudinal direction of the motor vehicle, seal profiles integrated into the first roof element at two edges running in the longitudinal direction of the motor vehicle and into the second roof element at an edge running in the longitudinal direction of the motor vehicle for sealing of the roof elements with respect to side windows and with respect to one another, identical rear seal profiles integrated into the first roof element and into the second roof element at edges running transverse to the longitudinal direction of the motor vehicle, each of the rear seal profiles has a first region configured for providing sealing of the roof elements with respect to the rollover hoop and each of the rear seal profiles has a second region configured for providing sealing with respect to a rear window that projects higher than a portion of the rollover hoop.

2. The roof of claim 1, wherein the seal profiles are formed from an elastomeric material.

3. The roof of claim 2, further comprising first shaped parts integrated into corner regions of the first roof element, the seal profiles integrated into the first roof element and the first shaped parts integrated into corner regions of the first roof element defining a U-shaped sealing element.

4. The roof of claim 3, further comprising second shaped parts integrated into corner regions of the second roof element, the seal profiles integrated into the second roof element and the second shaped parts integrated into corner regions of the second roof element defining an L-shaped sealing element.

5. The roof of claim 4, wherein the first and second shaped parts comprise an elastomeric material.

6. The roof of claim 5, further comprising sheet-metal inlays integrated into the first and second shaped parts for fastening the first and second shaped parts to the respective roof element.

7. The roof of claim 6, wherein the sheet-metal inlays are screwed or riveted to a wall of the respective roof element.

8. A motor vehicle comprising:
a windshield frame;
a rollover hoop rearward of the windshield fame and a rear window assigned to the rollover hoop, the rear window projecting higher than portions of the rollover hoop; and
a removable roof comprising: first and second roof elements divided from one another in a longitudinal direction of the motor vehicle, seal profiles integrated into edges of the roof elements that running in the longitudinal direction of the motor vehicle for sealing the roof elements with respect to side windows and with respect to one another, identical seal profiles integrated into the roof elements at rear edges running transverse to the longitudinal direction of the motor vehicle, each of the rear seal profiles has a first region configured for sealing the roof elements with respect to the rollover hoop and each of the rear seal profiles has a second region configured for providing sealing the rear window assigned to the rollover hoop.

9. The roof of claim 6 wherein the sheet-metal inlays are insert molded into the shaped parts.

10. The roof of claim 1, wherein the edge of the second roof element that runs in the longitudinal direction and has a seal profile integrated therein is an outer edge, the second roof element further having an inner edge running in the longitudinal direction of the vehicle and having no seal profile thereon, the edges of the first roof element that run in the longitudinal direction and have seal profiles integrated therein are inner and outer edges, the seal profile integrated into the inner edge of the first roof element being engaged directly with the inner edge of the second roof element.

11. The roof of claim 1 further comprising a seal profile integrated into the first roof element at edges running transverse to the longitudinal direction of the motor vehicle including upwardly concave and convex sections extending inward from opposite transverse sides of motor vehicle.

12. A removable roof for a motor vehicle that can be positioned between a windshield frame and a rollover hoop of a motor vehicle, the removable roof comprising: first and second roof elements divided from one another in a longitudinal direction of the motor vehicle, seal profiles integrated into the first roof element at two edges running in the longitudinal direction of the motor vehicle and into the second roof element at an edge running in the longitudinal direction of the motor vehicle for sealing of the roof elements with respect to side windows and with respect to one another, identical seal profiles integrated into the first roof element and into the second roof element at edges running transverse to the longitudinal direction of the motor vehicle and providing sealing of the roof elements with respect to the rollover hoop and with respect to a rear window assigned to the rollover hoop, first shaped parts integrated into corner regions of the first roof element, the seal profiles integrated into the first roof element and the first shaped parts integrated into corner regions of the first roof element defining a U-shaped sealing element, second shaped parts integrated into corner regions of the second roof element, the seal profiles integrated into the second roof element and the second shaped parts integrated into corner regions of the second roof element defining an L-shaped sealing element, wherein the first and second shaped parts comprise an elastomeric material.

\* \* \* \* \*